Sept. 16, 1947.  E. G. LA VISTA  2,427,465

SPECTACLES

Filed May 11, 1944

INVENTOR.
EDWARD G. LA VISTA
BY
ATTORNEY.

Patented Sept. 16, 1947

2,427,465

UNITED STATES PATENT OFFICE 2,427,465

SPECTACLES

Edward G. La Vista, New York, N. Y.

Application May 11, 1944, Serial No. 535,016

3 Claims. (Cl. 88—47)

The present invention relates to the construction of a pair of spectacles or adaption to currently used spectacles and the method of fitting them to the wearer.

Although in the description and illustration of my invention, I primarily refer as illustrative thereof to its use in post operative unilateral cataract procedure, the construction of spectacles and the method of fitting them herein contemplated applies as well to conventional spectacles used merely to correct visual acuity.

Heretofore surgeons sometimes hesitated to extract a unilateral cataract because of the adverse effect imposed upon that eye that was not operated upon by reason of heretofore used spectacle structure and conventional practices used to fit them to the wearer.

In practice, after the extraction of the cataract, the removed human lens was replaced by an inorganic (non-muscular controlled) glass lens, which was mounted in a pair of spectacles. Since such a lens does not accommodate itself to the variations in the distance at which the sight objective may be found and so the differences in focal length to which the human lens muscularly changes, it was required that the patient was fitted with two pairs of spectacles, one having a lens for distance vision and the other a lens for reading, which lenses at any event were comparatively heavy.

Ofttimes the vision in the other eye was satisfactory and needed no correction by a glass lens. In such cases, the patient operated upon was fitted only with the comparatively heavy double convex lens for the eye from which the cataract was removed, the other or good eye having a plain "window" in front of it for cosmetic reasons.

The lens for the eye operated on was made even heavier because it was necessary to grind on it another cylindrical lens, which latter had to be fitted in exact alignment and in the proper axis with the "fold" or "crease" in the cornea resulting from the cataract operation. If this double convex and accompanying cylindrical lens was for any reason displaced, the patient would not gain the improved vision sought for after the operation.

As a result, even though the other eye needed no vision correction, a slight or even a material correction, which always involved either a lighter plain glass or vision correcting lens, nevertheless there was wont to be prescribed for the other or good eye, a heavier lens, equal in weight to the double convex and cylindrical lens. This was done in order that the lens fitted to the eye operated upon would not be displaced on the wearer by the unequal weight of the two lenses.

Therefore, although the spectacles were thus equally balanced, the patient suffered impaired vision in the relatively good eye in order to obtain maximum visual acuity in the eye operated upon.

On the other hand if the lighter properly fitted lens was used for the good eye, improved vision in the eye operated upon was to an extent sacrificed because after a short time the heavier double convex and cylindrical lens portion of the spectacles became displaced on the wearer since it weighed considerably more than the lens in front of the good eye. As a result, the maximum possible benefit from the proper correction to the vision of the eye from which the cataract was removed was not obtained.

It was for this reason among others that a unilateral cataract was not always removed except as a last resort because the surgeon realized that at any event the operation required a choice between sacrificing full vision correction in the bad eye or possible impairment to the vision in the relatively good eye.

The present invention contemplates the provision of a pair of spectacles that are properly balanced irrespective of the comparative weight of the lenses mounted therein and the method of fitting such spectacles to the wearer, which structure and method are both applicable to post operative cataract spectacles and to conventional spectacles having lenses for differently correcting the vision in each eye of the wearer and which lens do not weigh the same.

These, other and further objects and advantages of the present invention will be clear from the description which follows and the drawing appended thereto in which Fig. 1 is a front elevation of a pair of spectacles according to my invention, the rim holding one lens being partially broken away to show the compensating balancing means.

Figure 1:
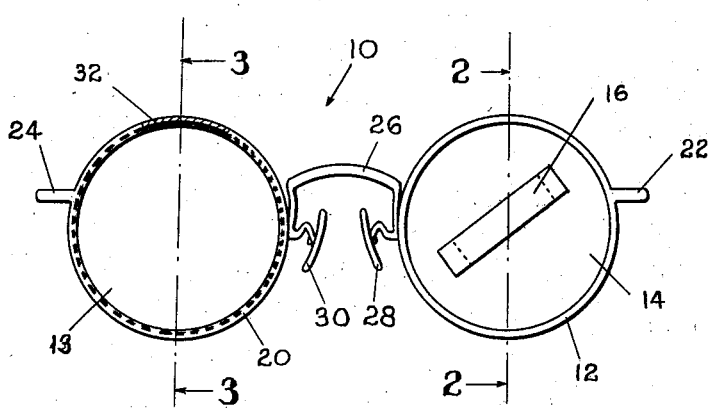
Figure 3:
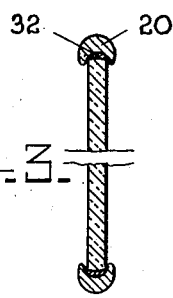
Fig. 3 is a section on the line 3—3 of Fig. 1 to an enlarged scale and broken away to condense the drawing.
Figure 2:
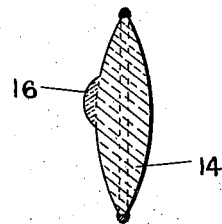
Fig. 2 is a section on the line 2—2 of Fig. 1.
Figure 4:
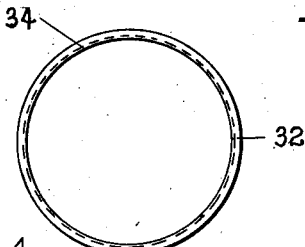
Fig. 4 is a front elevation of a balancing means that may be used.

Referring now to the drawing, I have there illustrated my invention as applied to an ophthalmic mounting generally indicated by the reference character 10 and which has a conventional rim completely around each lens, though, as will be apparent, it may be applied to any type of ophthalmic mounting.

After removal of a cataract from the eye and the lapse of a period of from six to eight weeks which is required to give the eye an opportunity to heal from the operative cut and removal of the human lens, the patient is fitted with an ophthalmic mounting in one rim 12 of which is fitted the double convex lens 14 which replaces the human lens that has been removed.

As stated above, in order to correct for the post operative crease or fold resulting in the cornea from the operation, there is ground to the lens 14 a cylindrical lens 16, which is shown in exaggeration in the drawing.

Since, as stated, the inorganic lenses 14 and 16 are non-adjustable to distance requirements, they must be designed for the maximum distance vision, 20/20, and are therefore relatively heavy.

The other eye may have been unaffected or at any event require less than total correction. The lens 18 mounted in the rim 20 is therefore much lighter than the combined lenses 14 and 16.

When the ophthalmic mounting is worn by properly positioning the ear pieces 22 and 24, the bridge 26, and nose-pieces 28 and 30 on the wearer, the heavier lenses 14 and 16 are out of balance with the lighter lens 18 about the wearer's nose which causes displacement of the lens with respect to the eye that it was designed to correct.

This was most serious in unilateral cataract post operative cases, since the cylindrical lens thus was displaced from its required alignment with the crease or fold in the cornea. I have shown the lens 16 arranged at a certain angle to the horizontal in the drawing, though it will be understood that this is for purposes of illustration only since the crease or fold will vary in position for each individual.

In order to compensate for the heavy lenses 14 and 16 and so provide an ophthalmic mounting that is evenly balanced, I make the rim 20 with a relatively deeper groove so that the preferably annular compensating rim 32 may fit thereinto and so that for cosmetic reasons it will not show.

The compensating annular rims 32 may be made from any suitable material, such as lead and will commercially be made in different weights so that each pair of spectacles may be fitted with the proper rim suitable for the individual that is to wear them.

To properly fit a pair of spectacles to the wearer, the lenses 14 and 16 and the lens 18 are separately weighed. The difference in weight between these lenses is noted and a rim 32 exactly equal to this difference in weight is then selected. The lenses 12 and 14 are then mounted in the rim 12 and the lens 18 and compensating annular ring 32 are together mounted in the other rim 20.

The annular ring 32 is provided with an internal groove 34 of sufficient depth to receive and mount a lens therein.

Each side of the ophthalmic mounting thus weighs the same and neither lens will be displaced with respect to the eye in front of which it is worn. As a result there is thus provided an equally balanced pair of spectacles which provides the desired visual acuity to each eye without danger of its being impaired.

The same method and spectacle construction may be used in those cases in which one lens differs in weight from the other lens, which may occur with persons who are not operated upon.

While I have illustrated my invention as applied to a rimmed ophthalmic mounting, it will be understood that this construction and method of fitting spectacles may be applied to so-called rimless spectacles by providing a compensating weight of suitable form and shape on the pertinent ear piece, nose piece, or the relevant portion of the bridge.

It will now be apparent that I have provided an ophthalmic mounting which may be used for unilateral cataract post operative procedure and eliminate the heretofore existing dangers of impairing the vision of either the bad eye or the good eye.

It will be further apparent that my invention may also be applied to those cases in which the lenses mounted in a pair of spectacles differ in weight from each other.

While I have illustrated a certain embodiment of my invention it will be understood that I do not intend to be limited to the details thereof but intend to claim my invention as broadly as the state of the art and the scope of the appended claims permit.

I claim:

1. A pair of spectacles comprising a pair of lenses, one lens heavier than the other, a rim for each lens and an annular member having the weight thereof uniformly distributed throughout arranged in the rim in which the lighter lens is mounted, said annular member of weight equal to the difference in weight between the heavier lens and the lighter lens and having a groove in which the lighter lens is received.

2. A pair of spectacles having two lenses, one of lighter weight than the other, a grooved rim for each lens and a member having its weight uniformly distributed there throughout equal in weight to the difference in weight between the heavier lens and the lighter lens, said member and lighter lens mounted in one groove and the heavier lens mounted in the other groove.

3. A pair of spectacles comprising a bridge, a pair of lenses mounted on the bridge, one lens being heavier than the other lens and means equal in weight to the difference in weight between the two lenses, said means mounted in the spectacles adjacent the lighter lens to counterbalance the weight of the heavier lens.

EDWARD G. LA VISTA.

REFERENCES CITED

The following references are of record in the file of this patent:

UNITED STATES PATENTS

| Number | Name | Date |
|---|---|---|
| 1,659,165 | Sangren | Feb. 14, 1928 |
| 1,995,617 | Katz | Mar. 26, 1935 |
| 1,325,511 | Durgin | Dec. 23, 1919 |

FOREIGN PATENTS

| Number | Country | Date |
|---|---|---|
| 382,106 | Germany | Sept. 28, 1923 |